United States Patent
Oskarsson (10) Patent No.: US 9,714,799 B2
(45) Date of Patent: Jul. 25, 2017

(54) ULTRA SAGGING AND MELTING RESISTANT FIN MATERIAL WITH VERY HIGH STRENGTH

(71) Applicant: Gränges Sweden AB, Finspång (SE)

(72) Inventor: Anders Oskarsson, Finspång (SE)

(73) Assignee: Gränges Sweden AB, Finspång (SE)

(*) Notice: Subject to any disclaimer, the term of this patent is extended or adjusted under 35 U.S.C. 154(b) by 396 days.

(21) Appl. No.: 14/401,640

(22) PCT Filed: May 23, 2013

(86) PCT No.: PCT/SE2013/050589
§ 371 (c)(1),
(2) Date: Nov. 17, 2014

(87) PCT Pub. No.: WO2013/176617
PCT Pub. Date: Nov. 28, 2013

(65) Prior Publication Data
US 2015/0101787 A1    Apr. 16, 2015

(30) Foreign Application Priority Data

May 23, 2012 (SE) ...................... 1250528

(51) Int. Cl.
*C22C 21/00* (2006.01)
*F28F 21/08* (2006.01)
(Continued)

(52) U.S. Cl.
CPC .......... *F28F 21/084* (2013.01); *B22D 11/003* (2013.01); *B22D 11/0622* (2013.01);
(Continued)

(58) Field of Classification Search
CPC ... F28F 21/084; B22D 11/003; C21D 8/0226; C21D 8/0236; C21D 8/02; C22C 21/00; C22F 1/04; B23K 35/286
See application file for complete search history.

(56) References Cited

U.S. PATENT DOCUMENTS

| 4,235,628 A | 11/1980 | Althoff et al. |
| 4,357,397 A | 11/1982 | Baba et al. |
(Continued)

FOREIGN PATENT DOCUMENTS

| EP | 0 326 337 A1 | 8/1989 |
| EP | 1 250 468 B1 | 12/2005 |
(Continued)

OTHER PUBLICATIONS

International Search Report from PCT/SE2013/050589 dated Aug. 30, 2013.
(Continued)

*Primary Examiner* — Jason L Vaughan
*Assistant Examiner* — Amanda Meneghini
(74) *Attorney, Agent, or Firm* — Morgan, Lewis & Bockius LLP (57) ABSTRACT

Method for producing AlMn strip or sheet for making components by brazing and products obtained by said method, in particular fin materials of thin gauge used in heat exchangers. Rolling slabs are produced from a melt with <0.3% Si, ≤0.5% Fe, ≤0.3% Cu, 1.0-2.0% Mn, ≤0.5% Mg, ≤4.0% Zn, ≤0.5% Ni, ≤0.3% each of group IVb, Vb, or VIb elements, and unavoidable impurity elements, as well as aluminum that, prior to hot rolling, are preheated at <550° C. to control the number and size of dispersoid particles, hot rolled into a hot strip, cold rolled into a strip with total reduction of at least 90%, and heat treated to obtain a 0.2% proof stress value that is 50-90% of its proof stress value in
(Continued)

the as cold rolled condition and in a range between 100 and 200 MPa. The strip may alternatively be produced by twin-roll strip casting.

36 Claims, 4 Drawing Sheets

(51) Int. Cl.

| | | |
|---|---|---|
| *B23K 35/28* | (2006.01) | |
| *B23K 35/02* | (2006.01) | |
| *C21D 8/02* | (2006.01) | |
| *C22C 21/02* | (2006.01) | |
| *C22F 1/04* | (2006.01) | |
| *C22F 1/043* | (2006.01) | |
| *B22D 11/06* | (2006.01) | |
| *B32B 15/01* | (2006.01) | |
| *B22D 11/00* | (2006.01) | |
| *F28F 19/00* | (2006.01) | |
| *B22D 21/00* | (2006.01) | |
| *F28F 1/10* | (2006.01) | |

(52) U.S. Cl.
CPC ........ *B22D 21/007* (2013.01); *B23K 35/0238* (2013.01); *B23K 35/286* (2013.01); *B32B 15/011* (2013.01); *C21D 8/02* (2013.01); *C21D 8/0226* (2013.01); *C21D 8/0236* (2013.01); *C22C 21/00* (2013.01); *C22C 21/02* (2013.01); *C22F 1/04* (2013.01); *C22F 1/043* (2013.01); *F28F 19/004* (2013.01); *C21D 2251/02* (2013.01); *F28F 1/10* (2013.01); *Y10T 428/12063* (2015.01)

(56) References Cited

U.S. PATENT DOCUMENTS

| | | | |
|---|---|---|---|
| 5,125,452 A | 6/1992 | Yamauchi et al. | |
| 5,476,725 A | 12/1995 | Papich et al. | |
| 6,451,453 B1 | 9/2002 | Kucza et al. | |
| 6,743,396 B2 | 6/2004 | Wagner et al. | |
| 8,574,723 B2 | 11/2013 | Ekström | |
| 2006/0105193 A1* | 5/2006 | Burger | B23K 35/00 |
| | | | 428/654 |
| 2008/0011816 A1 | 1/2008 | Kilmer | |
| 2008/0118393 A1 | 5/2008 | Oskarsson et al. | |
| 2010/0012229 A1 | 1/2010 | Oskarsson et al. | |
| 2010/0291400 A1 | 11/2010 | Ahl et al. | |
| 2011/0240277 A1 | 10/2011 | Westergard et al. | |
| 2012/0070681 A1 | 3/2012 | Norgren et al. | |
| 2012/0177947 A1 | 7/2012 | Abrahamsson et al. | |
| 2012/0199634 A1 | 8/2012 | Ekstr m et al. | |

FOREIGN PATENT DOCUMENTS

| | | | |
|---|---|---|---|
| EP | 1 918 394 A2 | 5/2008 | |
| EP | 2 236 240 A1 | 10/2010 | |
| EP | 2 253 726 A2 | 11/2010 | |
| SE | 510272 C2 | 5/1999 | |
| SE | EP 2253726 A2 * | 11/2010 | ......... B23K 35/0233 |

OTHER PUBLICATIONS

Written Opinion of the International Searching Authority dated Aug. 30, 2013, for corresponding International Application No. PCT/SE2013/050589.

* cited by examiner

ULTRA SAGGING AND MELTING RESISTANT FIN MATERIAL WITH VERY HIGH STRENGTH

RELATED APPLICATIONS

The present application is a U.S. National Phase Application of International Application No. PCT/SE2013/050589, filed 23 May 2013, which claims priority to Swedish Application No. 1250528-5, filed 23 May 2012.

BACKGROUND

The present invention relates to a method for producing AlMn strip or sheet for producing components by brazing, as well as the products obtained by said method. In particular this method is related to fin materials used in heat exchangers.

A challenge today is to manufacture light-weight components for the automotive market. A lot of research is therefore directed to reduce the weight of heat exchangers by using thinner strip without sacrificing, but instead often improving, other product and manufacturing properties. To be able to do this it is necessary to create new materials with higher post braze strength compared to the alloys presently used but still with adequate corrosion properties. For fins this means that they normally should be sacrificially paired with other parts of the heat exchanger by having a lower corrosion potential than those. The increased fin strength has to be achieved in modern CAB furnaces, which restricts the use of certain alloying elements, like Mg, previously used in strip for vacuum brazing. The fin strip must be easy to handle for the manufacturer and the strip formed to fins are always slightly deformed prior to brazing which puts some requirements on formability in the delivery condition. The fin strip is always delivered in thin, 50-200 µm, and cut narrow strip, making it very difficult to handle if fully soft annealed. Therefore the strip is normally delivered in half hard condition with restricted formability.

To reach higher post braze strength levels is quite complicated without hazarding the brazing performance described as sagging resistance and resistance to liquid core penetration during brazing or the necessary formability when forming the fins out of the strip. Only when these requirements are met consistently by the new materials, this will allow the use of thinner fins with a high post brazed strength, thereby reducing the weight compared to the products used today. In resent years, problems with severe liquid core penetration have occurred when using thin clad fin, especially if using slow braze heating cycles.

PRIOR ART

In a previous method known from EP 1918394 rolling slabs are produced from a melt which contains 0.3-1.5% Si, ≤0.5% Fe, ≤0.3≤Cu, 1.0-2.0% Mn, ≤0.5% Mg, ≤4.0% Zn, ≤0.3% each of elements from group IVb, Vb, or VIb elements, and unavoidable impurity elements, as well as aluminium as the remainder in which the rolling slabs prior to hot rolling are preheated at a preheating temperature of less than 550° C. to control the number and size of dispersoid particles, and the preheated rolling slab is thereafter hot rolled into a hot strip. The post braze strength and sagging resistance of the fin strip is high as well as the corrosion resistance of brazed parts made from the strip.

Other examples of methods for producing strips adapted for brazing may for example be found in SE 510 272, U.S. Pat. No. 6,743,396 and U.S. Pat. No. 4,235,628.

For brazed exchangers it is normally necessary to choose different alloys in different parts in fins, tubes, plates and headers to avoid corrosion to perforation of tubes and plates by sacrificing the fins. This is often done by alloying the fins with Zn to reduce their corrosion potential to an adequate level compared to other parts. In a consequence to this, materials used for tubes and plates normally have additions of Mn and Cu with the aim to increase their corrosion potential. This is one of the reasons why the optimum composition and processing for fins is quite different from processing of tubes or plates. Previously known methods do however often result in insufficient properties of the aluminium strip for certain applications when the manufacturers need to down gauge, especially when using slow braze cycles. This particularly applies for the good sagging resistance and low susceptibility for liquid core when combined with the high post braze strength together with the formability requirements to produce the fins from the strip.

SUMMARY

The object of the present invention is an aluminium strip, which after brazing have a very high strength combined with excellent brazing performance, described as a high sagging resistance and a very low susceptibility to liquid core penetration during brazing, as well as good forming properties in the as delivered strip condition. The strip is mainly intended for thin clad fin applications in heat exchangers produced by CAB brazing, but can also be produced by vacuum brazing.

The object is achieved by the sagging resistant strip according to independent claims 1, 2 and 4 and the methods for producing a sagging resistant strip according to independent claims 13, 14 and 16. Embodiments are defined by the dependent claims. The sagging resistant strip according to the present invention is suitably used to produce heat exchangers comprising fins made of the sagging resistant strip.

The sagging resistant strip is produced by casting a melt comprising:
<0.30% Si, preferably <0.25%, most preferably below 0.20%,
≤0.5% Fe,
≤0.3% Cu
1.0-2.0% Mn,
≤0.5% Mg, preferably 0.3%,
≤4.0% Zn,
≤0.5% Ni,
≤0.3% each of dispersoid forming elements from group IVb, Vb, or VIb, and unavoidable impurity elements, each at most 0.05%, in a total amount of at most 0.15%, the rest aluminium, so as to obtain a core ingot. The ingot is preheated at a temperature of less than 550° C., preferably 400-520° C., more preferably 400-500° C., most preferably more than 430 up to 500° C., so as to form dispersoid particles, and thereafter hot rolled together with a braze alloy to obtain a clad strip. The strip is thereafter cold rolled with a total reduction of at least 90% of the core material, preferably >95%, without intermediate annealing giving recrystallisation of the material, resulting in a strip having a first proof stress value, and thereafter heat treated to the delivery temper with the purpose to soften the material by a tempering without any recrystallisation of the strip alloy, in such a way that a strip is obtained having a second proof stress value which is 10-50% lower than the first proof stress value obtained directly after cold rolling, preferably 15-40% lower, and lying in the 0.2% proof stress range of 100-200 MPa, more preferably 120-180 MPa, most preferably 140-180 MPa. A braze alloy is provided on the core ingot either before or directly after the preheating step. This can preferably be performed by attaching or assembling an ingot of a braze alloy to the core ingot prior to the hot rolling step either before or after the preheating. However, the braze alloy may also be added in accordance with other known processes.

The sagging resistant strip may also be produced by casting a melt having the same composition as given above so as to obtain a core ingot. The core ingot is preheated at a temperature of less than 550° C., preferably 400-520° C., more preferably 400-500° C., most preferably more than 430 up to 500° C., so as to form dispersoid particles, and thereafter hot rolled to a core strip. The core strip is thereafter cold rolled together with a strip of a braze alloy so as to obtain a clad strip. The cold rolling is continued so that the total reduction of the core strip obtained during cold rolling is at least 90% without any intermediate anneal giving recrystallisation of the material and resulting in a strip having a first proof stress. The cold rolled strip is thereafter heat treated to the delivery temper with the purpose to soften the material by a tempering without any recrystallisation of the strip alloy, in such a way that a strip is obtained having a second proof stress value which is 10-50% lower than the first proof stress value obtained directly after cold rolling, preferably 15-40% lower, and lying in the 0.2% proof stress range of 100-200 MPa, more preferably 120-180 MPa, most preferably 140-180 MPa.

Alternatively, the sagging resistant strip may be produced by twin-roll strip casting a melt having the same composition as given above. The as-cast strip is cold rolled to an intermediate gauge material and thereafter annealed so as to form dispersoid particles. The intermediate gauge material is thereafter cold rolled to a finstock material of final gauge with a rolling reduction of at least 60% of the core material, preferably above 80%, more preferably above 90% and most preferably above 95% without intermediate annealing giving recrystallisation of the material, resulting in a finstock material having a first proof stress value. The fin stock material is thereafter heat treated to the delivery temper with the purpose to soften the material by a tempering without any recrystallisation of the strip alloy, in such a way that a strip is obtained having a second proof stress value which is 10-50% lower than the first proof stress value obtained directly after cold rolling in step d), preferably 15-40% lower, and lying in the 0.2% proof stress range of 100-200 MPa, preferably 120-180 MPa, more preferably 120-160 MPa. A braze alloy is provided on the core strip either prior to or after the cold rolling to intermediate gauge, for example a braze alloy strip may be roll clad to the twin-rolled core material having the composition specified above, or may be co-cast in the twin roll process.

The material obtained according to the present invention has got a very high strength after brazing in a unique combination with excellent brazing performance like a high sagging resistance and a very low susceptibility for liquid core penetration during brazing and a good formability in the delivery temper. In particular this material is unique when used for thin clad fin applications. The fin material has a corrosion potential that may be adjusted, by controlled additions of zinc, to other parts of the heat exchanger like tubes so that the tubes can be protected by a sacrificial fin material. The material may be used to make products by any brazing method, in particular the controlled atmosphere brazing method (CAB).

The sagging resistant strip may also be clad with at least one additional (third) layer if desired, such as an additional layer of a braze alloy, a commercially pure aluminium alloy or an aluminium alloy comprising 0.6-6.5% Si.

BRIEF DESCRIPTION OF THE DRAWINGS

FIGS. 3 a) and b) show a manufacturing route for the DC-cast material and for the twin-rolled material according to the invention.

DETAILED DESCRIPTION OF THE INVENTION

The present invention will be described in detail below and with the assistance of certain examples. These examples shall not be considered to limit the invention, the scope of the invention is defined by the appended claims.

Furthermore, all chemical compositions given in the present disclosure are given in percent by weight.

The present invention is an aluminium strip and methods for producing said aluminium strip. After brazing, the aluminium strip has a very high strength combined with very excellent brazing performance, described as a high sagging resistance and a very low susceptibility to liquid core penetration during brazing, as well as good forming properties in the as delivered strip condition. The strip is mainly intended for thin clad fin applications in heat exchangers produced by CAB brazing, but can also be used for heat exchangers produced by vacuum brazing.

A small amount of local melting of the core next to the clad during brazing cannot be avoided due to diffusion of Si from the braze clad into the core. This phenomenon, here called liquid core penetration, lowers the material strength during brazing and makes the brazed product prone to corrosion. It has been discovered that when clad fin strips according to the prior art are thin or the brazing cycles long or high temperatures are used at brazing, Si diffusion from the braze material into the core causes local melting of grain boundaries into a significant part of the strip thickness.

Figure 2:
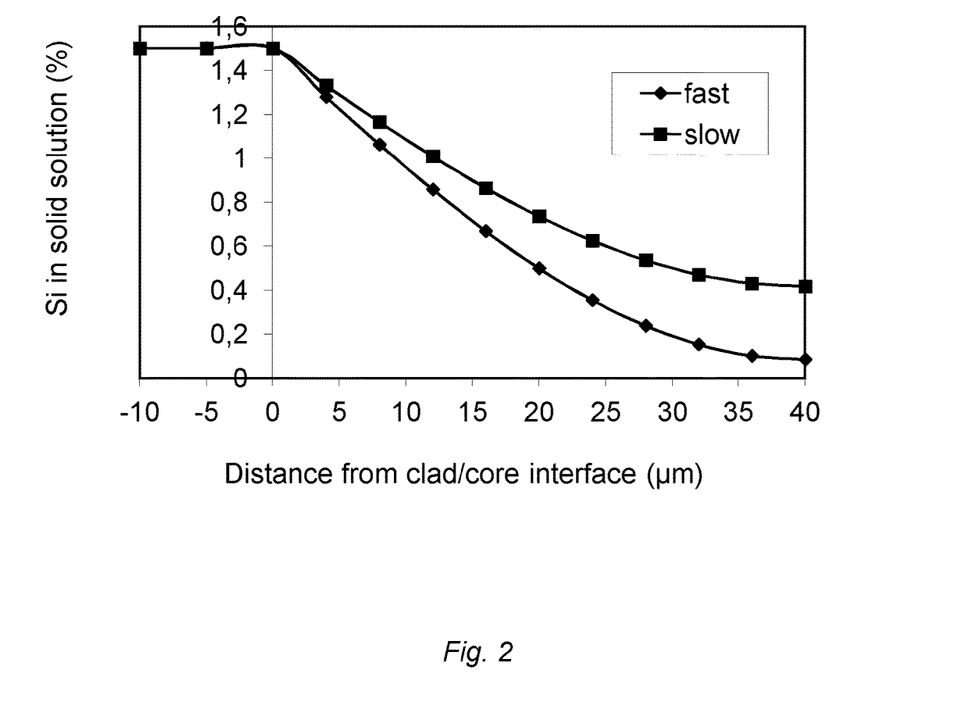
FIG. 2 shows the Si in solid solution as a function of the distance from the surface of the strip from a diffusion simulation of Si from the braze clad into a core aluminium matrix just before the braze clad melts using slow and fast braze cycles. The core material contains initially 0.25% Si. The lower Si content in the aluminium matrix is the result of some Si being tied up in Al(MnFe)Si particles.

It has been found, using computer simulations at a core thickness of 100 μm and a Si content of 0.25% in the core, that melting will not significantly affect the core, not even if a slow brazing cycle (9 minutes from 500° C. to 577° C.) is used. This is due to the fact that the Si content in the center of the core is not increased above the melting limit, i.e. above 0.4%. This is illustrated in FIG. 2, showing the computer simulation results for both a slow brazing cycle and a fast brazing cycle (in this case 2 minutes from 500° C. to 577° C.). In the case of the fast brazing cycle, it is clear that the Si content in the center of the core, i.e. as far away for the interface between the clad of the brazing and the core as possible is minimal.

The method according to the present invention for producing sagging resistant AlMn strips includes producing a rolling slab from a melt which contains (in weight-percent) <0.3% Si, preferably <0.25% Si, most preferably <0.20% Si, ≤0.5% Fe, ≤0.3% Cu, 1.0-2.0% Mn, ≤0.5% Mg, ≤4.0% Zn, ≤0.5 Ni, ≤0.3% of each of elements from group IVb, Vb, or VIb elements, the sum of these elements being ≤0.5%, and unavoidable impurity elements, whose individual amounts are at most 0.05% and whose sum is at most 0.15%, as well as aluminium as the remainder. The rolling slab is prior to hot rolling preheated at a preheating temperature of less than 550° C., preferably between 400 and 520° C., more preferably between 400 and 500° C., even more preferably more than 430 up to 500° C., to control the number and size of dispersoid particles (particles precipitated from supersaturated solid solution). The preheated rolling slab is thereafter hot rolled into a hot strip. Normal total hot rolling height reduction of the strip thickness is >95%. The hot strip exit gauge is in the range from 2 to 10 mm. The strip may be annealed after hot rolling or at a cold rolled thickness above 0.5 mm. The strip is thereafter cold rolled without intermediate annealing giving recrystallisation of the material into a strip with a total reduction of at least 90%, preferably above 95%, most preferably at least 97.5%. The fact that cold rolling is performed without any intermediate annealing resulting in recrystallisation ensures that the proper amount of deformation is achieved and retained in the material, and is possible due to the composition of the aluminium alloy. The cold rolled strip is then heat treated to obtain a proof stress value that is 50-90% of its proof stress value in the as cold rolled condition (not fully soft annealed) to a 0.2% proof stress in the range between 100 and 200 MPa, more preferably in the range 120-180 MPa, most preferably 140-180 MPa. The specific conditions, such as temperature and duration, for said heat treatment depend for example on the degree of previous deformation, but can easily be determined by the person skilled in the art. The strip material then has a microstructure comprising a number density of particles in the range between $1*10^6$ and $20*10^6$, preferably between $1.3*10^6$ and $10*10^6$, most preferably between $1.4*10^6$ and $7*10^6$ particles/mm$^2$ the particles having an equivalent diameter in the range of 50-400 nm. The majority of these fine particles are created during the preheating prior to hot rolling. The particle density may be determined by conventional techniques, such as by means of image analysis systems coupled to for example a scanning electron microscope.

Alternatively to the method described above, the same alloy composition can be cast by continuous casting into a strip, e.g. by twin-roll strip casting, such as described in EP1250468. The strip may then be clad with braze liner on one or two sides, for instance by ambient bonding. This can be done either in the as-cast condition or after some cold rolling. The strip is further rolled to form an intermediate gauge article, which is then annealed, and once again cold rolled with a rolling reduction of at least 60%, preferably above 80%, more preferably above 90%, and most preferably above 95%, after the recrystallisation of the intermediate gauge article, without any intermediate recrystallisation annealing, so as to obtain a finstock material of final gauge, which has a first proof stress value. The fact that cold rolling is performed without any intermediate annealing resulting in recrystallisation ensures that the proper amount of deformation is achieved and retained in the material, and is possible due to the composition of the aluminium alloy. The finstock material is heat treated to the delivery temper with the purpose to soften the material by a tempering without any recrystallisation of the strip alloy, in such a way that a strip is obtained having a second proof stress value which is 10-50% lower, preferably 15-40% lower, than that obtained directly after the second cold rolling, whereby the resulting 0.2% proof stress lies in the range of 100-200 MPa, preferably 120-180 MPa, more preferably 130-170 MPa. The specific conditions, such as temperature and duration, for said heat treatment depend for example on the degree of previous deformation, but can easily be determined by the person skilled in the art. The strip material then has a microstructure comprising particles having a diameter in the range of 50-400 nm with a number density of particles in the range between $1*10^6$ and $20*10^6$, preferably $1.3*10^6$ and $10*10^6$, more preferably between $1.4*10^6$ and $7*10^6$ particles/mm$^2$. The majority of the particles have been created during the intermediate annealing.

Typical thickness of the cold rolled finished strip is less than 0.15 mm, preferably less than 0.10 mm, most preferably less than 0.08 mm. The material only has the desired properties for the tempered state, for example in the state H22, H24 or in the state H26 (strain hardened, re-annealed to ¼, ½ and ¾ hardness respectively). The annealing treatment is performed as re-annealing in the coil or in a continuous annealing furnace using a temperature to be adjusted accordingly.

The present invention is essentially based on a composition of the melt used to tailor the microstructure development during the complete processing to give the desired post braze properties and performance during brazing in combination with adequate delivery properties of the strip. In particular the high post braze strength combined with a good sagging resistance and low susceptibility to liquid core penetration during brazing, as well as a relatively good formability in the delivery condition prior to fin forming is the focus for this invention. The post braze 0.2% proof stress value is at least 60 MPa, and normally about 70 MPa. The sagging resistance of the material is ≤25 mm, more preferably ≤20 mm, most preferably ≤15 mm, when measured as defined in example 2 on a strip less than 0.1 mm in thickness. No severe liquid core penetration occurs during brazing. The formability measured as fracture elongation, $A_{50mm}$, is normally above 3%. As the coil always is cut in rather narrow strips before delivery, all mechanical properties are measured and defined in the rolling direction. These excellent properties are inter alia a result of the processing comprising cold rolling to final gauge without any intermediate annealing, in combination with the specific composition, as described above.

Figure 3A:
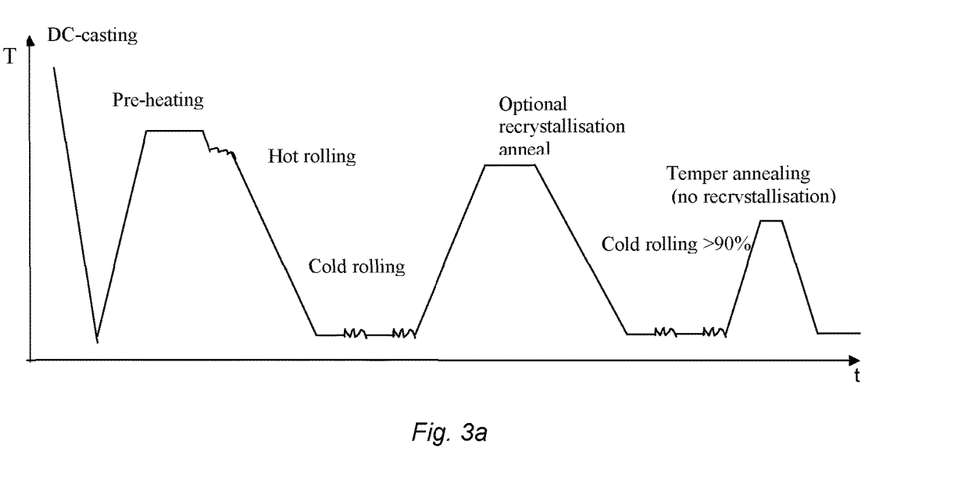
Figure 3B:
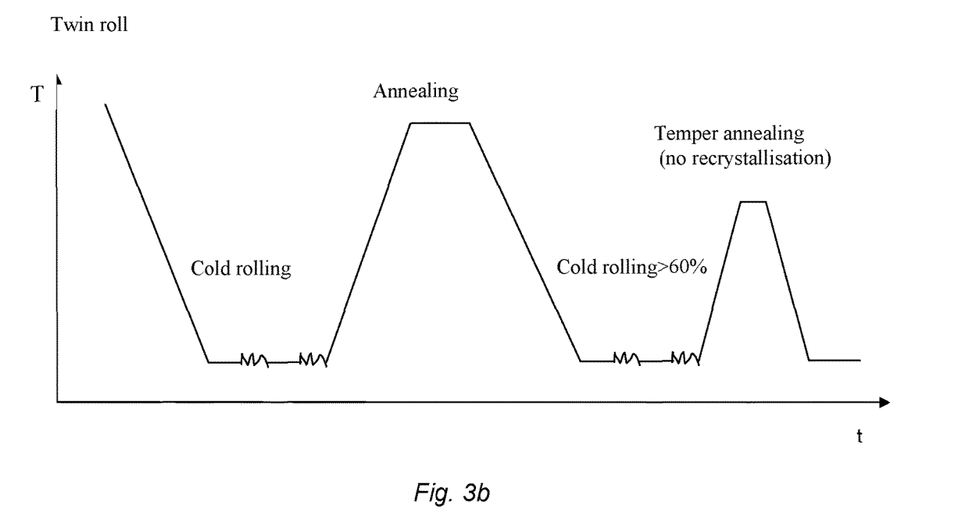

A high degree of deformation increases the driving force while a high number of small particles retard the driving pressure for recrystallisation. The driving force increases with increased rolling reduction, especially cold reduction, but will be decreased by recovery during the final temper annealing. The strength in the delivery condition for this type of alloy and processing is proportional to the driving force. The number density of small particles should be controlled and balanced with the number density of particles that is proportional to the retarding pressure hindering recrystallisation. It is of uttermost importance to control the driving force and the retarding pressure quantitatively to achieve the good material properties at the different stages mentioned above. This is achieved by using an aluminium alloy according to the invention and the process steps schematically shown in FIGS. 3a and 3b:

1) Controlled precipitation step for small dispersoid particles that are quantified. This is prior to hot rolling for DC route and during first intermediate annealing for twin roll casting route
2) A high cold rolling reduction larger than a minimum value after last annealing step leading to recrystallization
3) A final temper annealing of final gauge strip not leading to recrystallization Control of the composition and the process within the ranges claimed in this invention gives a high reproducibility of the material properties.

The material obtained according to the present invention has got a very high strength after brazing in a unique combination with excellent brazing performance like a high sagging resistance and a very low susceptibility for liquid core penetration during brazing and a good formability in the delivery temper. In particular this material is unique when used for thin clad fin applications. The fin material has a corrosion potential that may be adjusted, by controlled additions of zinc, to other parts of the heat exchanger like tubes so that the tubes can be protected by a sacrificial fin material. The material may be used to make products by any brazing method, in particular the controlled atmosphere brazing method (CAB).

Mn in dispersoid particles and in solid solution increases the post braze strength. Furthermore, Mn in a controlled number of particles is beneficial to control the sagging resistance and sensitivity to liquid core penetration as these particles control the recrystallisation process during braze heating leading to the formation of large recrystallised grains. The Mn content of the melt provided according to the present invention of at least 1.0 to at most 2.0% supports the strength of the strip according to the present invention.

Optimized properties may be reliably achieved if the Mn content is at least 1.3% and at most 1.8%, even more preferably if the Mn content is between 1.4 and 1.7%.

Fe has an adverse effect mainly as it increases the risk for formation of large intermetallic constituent particles formed during solidification. It then limits the amount and use of Mn in the material. It is therefore limited to 0.5%, preferably to 0.3%.

Si decreases the solubility of Mn and creates a high density of dispersoid particles combined with Mn. This promotes high strength and good sagging resistance. Some Si is also in solid solution. Both in solid solution and in dispersoid particles, Si adds to the strength. Too high level of Si increases the risk for liquid core penetration during brazing. Too low Si in the core have in techniques according to prior art decreased the post braze strength, for example EP 1 918 394 discloses that a minimum content of 0.3% Si is necessary to obtain the desired strength. However, in accordance with the present invention, it has been found that the present process enables a maintained strength even for a Si content of less than 0.3%. Generally, a Si content of less than 0.3% increases the cost of the material mainly due to the fact that the amount recycled scrap that can be used for its production is significantly decreased. However, the properties obtainable by the process in combination with the composition of the material according to the present invention generally outweigh the disadvantage of the increased cost, especially for thin clad applications. The Si content of the core should thus be <0.3% Si, preferably <0.25%, most preferably <0.20% to minimise the risk for local core melting during brazing.

The strength and sagging resistance may be further improved by the addition of group IVb, Vb, or VIb elements of the periodic table, or combinations of these elements, to the alloy according to the present invention, as some of these elements will add to the number density of fine dispersoid particles. The individual content of these dispersoid forming elements should be lower than 0.3%, and the sum of these elements ≤0.5% to avoid formation of coarse constituent particles formed during solidification. Such particles have a negative influence on the formability and strength of the strip produced according to the present invention. The content of the group IVb, Vb, or VIb elements should preferably be in the range 0.05-0.2%. Preferably ≤0.3% Zr is used as the dispersoid forming element from these groups, preferably in the range 0.05-0.2%, more preferably 0.1-0.2%. Furthermore, in combination with Mn and Fe, Cr may lead to very coarse constituent particles. Therefore, in the alloy used according to the present invention, if Cr is added the Mn content has to be reduced.

The content of Cu is limited to at most 0.3%, preferably below 0.1%, in the alloy used according to the present invention. Cu increases the strength, but also leads to a more positive corrosion potential which is not desired in fin materials. A positive corrosion potential restricts the possibilities of combination with other materials in a brazed heat exchanger. In addition, the corrosion behaviour, particularly in regard to intercrystalline corrosion, worsens with increasing Cu content.

Small amounts of Mg may be added to an alloy used according to the present invention as a strength increasing element. However, since Mg has a very strong negative influence on the brazeability in CAB, the content of magnesium is restricted to at most 0.5%, preferably to below 0.3%, most preferably to below 0.1%. It furthermore increases the risk for incipient melting of the material at the brazing temperature.

Zn may be added to decrease the corrosion potential of the fin material and thereby provide the tubes with a cathodic protection by sacrificing the fins. By using an adjustable Zn content in the fin, the difference in corrosion potential between tubes and fins can be chosen to an adequate level for each application. The Zn content used is normally restricted to 4.0% and is more preferably between 0.5 and 2.8%.

The amount of Sn should preferably be kept below 0.009% to avoid problems at rolling.

For brazing of the strip produced according to the present invention, it may be favourable to the mechanical strength if the strip is clad on one or both sides, using cladding layer thicknesses of 3% to 20% of the total thickness of the strip on each side. The alloys concerned may, for example, be typical brazing alloys based on Al—Si (Si 7-13%), such as AA4343, AA4045 or AA4047, as well as typical protective claddings based on commercially pure Al alloys (AA1XXX, Si 0-0.5%) and the modifications of these alloys (Si 0.5-7% or Si 0.6-6.5%), such as Al alloys having a Si content of 1, 2, 3, 4, 5 or 6% Si. The cladding is preferably applied in this case by roll cladding.

EXAMPLES

The material was DC-cast, followed by pre heating below 550° C., hot rolling to 4 mm and cold rolling to the different final thicknesses. The material in H14 condition (70 HSi) was fully soft annealed at 0.115 mm intermediate gauge.

The proof stress and elongation values prior to brazing, the sagging resistance and risk for liquid core penetration as well as the post braze strength for the different conditions are shown in Tables 3 to 5. The post braze strength is considerably lower for the H14 (intermediately annealed and finally cold rolled) delivery condition than the others.

Materials are labelled according to thickness and the content of Si in the material. In 50LSi and 70LSi. 50 and 70 stands for the gauge in microns and LSi for low silicon, 0.16%. As a reference 50MSi, 70MSi and 70HSi was chosen (M stands for medium silicon, ~0.5%, H denotes high silicon, 0.78% Si). The materials were in temper H24 except for 70HSi which was in H14 temper. Table 1 shows the compositions of the samples.

TABLE 1

Alloy compositions used for the cores and the braze claddings

| | | Si | Fe | Cu | Mn | Mg | Zn | Zr | Ti |
|---|---|---|---|---|---|---|---|---|---|
| 50LSi | Clad1 | 8.0 | 0.16 | <0.01 | 0.02 | 0.02 | <0.01 | <0.01 | <0.01 |
| | Core | 0.16 | 0.24 | 0.03 | 1.56 | <0.01 | 1.5 | 0.11 | 0.02 |
| | Clad2 | 8.0 | 0.16 | <0.01 | 0.02 | 0.02 | <0.01 | <0.01 | <0.01 |
| 50MSi | Clad1 | 7.8 | 0.14 | <0.01 | 0.02 | 0.01 | <0.01 | <0.01 | <0.01 |
| (Reference) | Core | 0.50 | 0.21 | 0.02 | 1.59 | <0.01 | 1.5 | 0.13 | 0.02 |
| | Clad2 | 7.8 | 0.14 | <0.01 | 0.02 | 0.01 | <0.01 | <0.01 | <0.01 |
| 70LSi | Clad1 | 8.0 | 0.16 | <0.01 | 0.02 | 0.02 | <0.01 | <0.01 | <0.01 |
| | Core | 0.16 | 0.24 | 0.03 | 1.6 | <0.01 | 1.5 | 0.11 | 0.02 |
| | Clad2 | 8.0 | 0.16 | <0.01 | 0.02 | 0.02 | <0.01 | <0.01 | <0.01 |
| 70MSi | Clad1 | 7.8 | 0.14 | <0.01 | 0.02 | 0.01 | <0.01 | <0.01 | <0.01 |
| (Reference) | Core | 0.50 | 0.21 | 0.02 | 1.6 | <0.01 | 1.5 | 0.13 | 0.02 |
| | Clad2 | 7.85 | 0.14 | <0.01 | 0.02 | 0.01 | <0.01 | <0.01 | <0.01 |
| 70HSi | Clad1 | 7.9 | 0.13 | <0.01 | 0.02 | 0.01 | <0.01 | <0.01 | <0.01 |
| (Reference) | Core | 0.78 | 0.22 | 0.02 | 1.6 | <0.01 | 1.4 | 0.12 | 0.03 |
| | Clad2 | 7.8 | 0.13 | <0.01 | 0.02 | 0.01 | <0.01 | <0.01 | <0.01 |

Example 1

Braze simulations using different brazing cycles were performed on the above materials.

Samples were formed as fins and brazed on unclad AA3003 plates after fluxing. Two different brazing cycles were tested in order to simulate different speeds in brazing cycles as shown in Table 2 and FIG. 4. The dark curve shows the fast cycle and the light curve the slow cycle corresponding to a typical condenser brazing cycle. The brazed samples were cross sectioned and studied. The quality of the joints was graded and the amount of filler penetrating the core was evaluated (see Table 3). The amount of filler metal penetrations found were graded as: Many or Few.

In cycle Slow the 50LSi material had fewer areas with filler metal core penetration than the 50MSi material.
In the 70LSi and 70MSi materials very few areas were found with filler metal inside the fin cores.
In the 70MSi material many areas with filler metal core penetration was fond.

Figure 4:
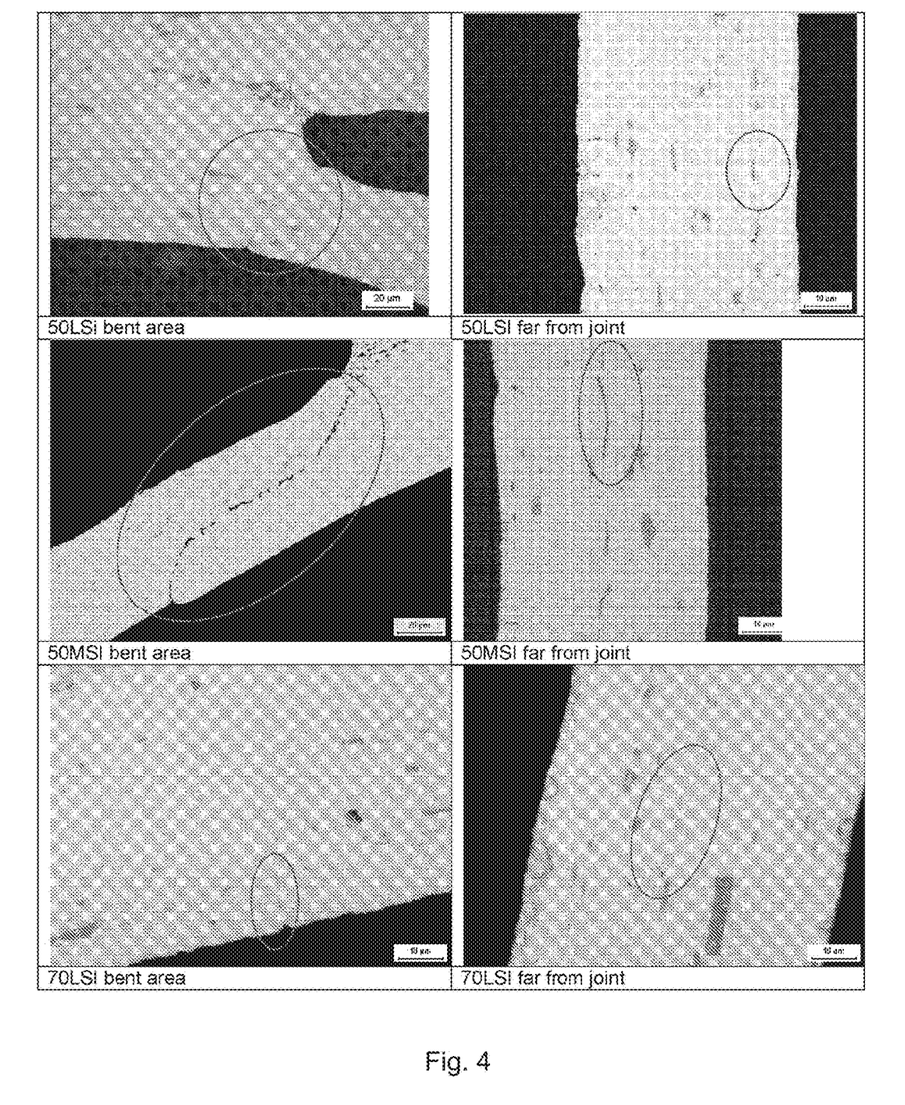
FIG. 4 shows worst case appearances of the braze joints after brazing cycle C.

Filler metal penetration is an indication that sagging problems may occur at brazing. FIG. 4 shows worst case appearances of the braze joints after Slow brazing cycle.

TABLE 2

Brazing cycles used in the braze simulation trials

| Fast | Slow |
|---|---|
| RT to 475 C.° −30 C. °/min | RT to 500 −30° C./min |
| 475 C.° to 560° C. −25 C. °/min | 500° C. to 600° C. −10° C./min |
| 560° C. to 575° C. −20° C./min | 3 min at temperature |
| 575° C. to 595° C. −17° C./min | |
| 595° C. to 600° C. −12° C./min | |
| 3 min at temperature | |

TABLE 2-continued

Brazing cycles used in the braze simulation trials

| Fast | Slow |
|---|---|
| | (RT to 600° C. in 20 minutes and 3 minutes at temperature) |

TABLE 3

The amount of filler metal core penetrations during brazing.

| | Fast braze cycle | Slow braze cycle |
|---|---|---|
| 50LSi | Few | Few |
| 50MSi | Few | Many |
| 70LSi | Few | Few |
| 70MSi | Few | Few |
| 70HSi | Many | Many |

Example 2

Figure 1:
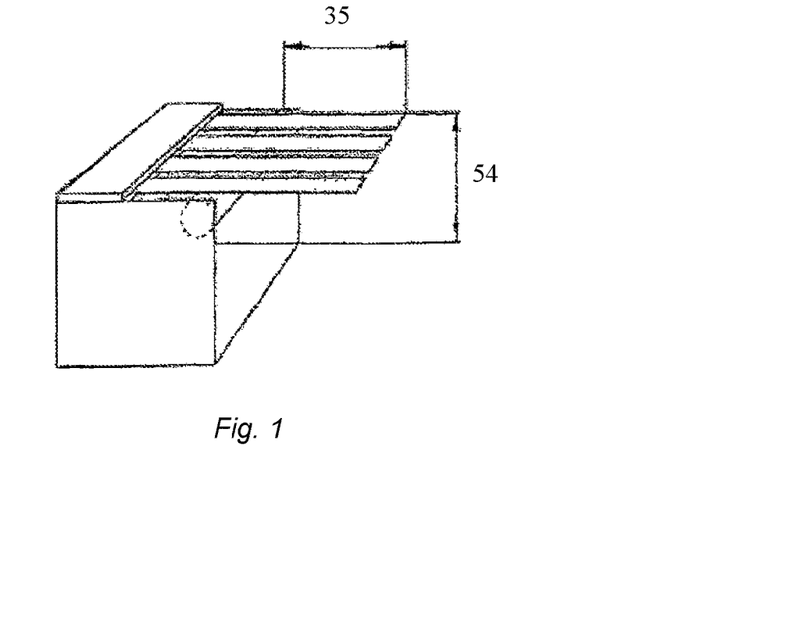
FIG. 1 shows a rig with mounted samples used for the sagging tests, using a cantilever beam length of 35 mm.

The sagging resistance of samples braze simulated according to Slow braze cycle was measured according to the following method: The material is mounted in a special rig as shown in FIG. 1. Samples 15 mm wide were cut across the rolling direction and at least 90 mm along the rolling direction. Four samples were mounted in the rig. The cantilever beam length was 35 mm, and the free end of the cantilever was 54 mm above the surface of the measuring table.

The rigs were placed in the oven and the temperature was raised according to braze cycle Slow. The samples were removed immediately after the last soak at 600° C.

The sagging resistance of the material with 0.16% Si showed to be much better than the sagging resistance of the reference sample containing 0.5% Si, table 4.

TABLE 4

Sagging, beam length 35 mm

| | Thickness (μm) | Sagging (mm) |
|---|---|---|
| 50LSi | 49 | 6 |
| 50MSi | 51 | 27 |

Example 3

Tensile testing was performed in delivery condition and after braze simulation using brazing cycle Fast see Table 5. The result shows that the highest strength for a given thickness in the delivery condition is obtained for the samples with a low Si content.

TABLE 5

Result from tensile testing on samples taken from the middle of the strip before and after braze simulation

| | Delivery condition | | | | After braze simulation | | | |
|---|---|---|---|---|---|---|---|---|
| Sample | Gauge (mm) | $R_{p0.2}$ (MPa) | $R_m$ (MPa) | $A_{50\,mm}$ (%) | Gauge (mm) | $R_{p0.2}$ (MPa) | $R_m$ (MPa) | $A_{50\,mm}$ (%) |
| 50LSi | 0.051 | 158 | 173 | 6 | 0.048 | 72 | 158 | 4 |
| 50MSi | 0.051 | 144 | 168 | 8 | 0.048 | 73 | 157 | 4 |
| 70LSi | 0.070 | 174 | 190 | 9 | 0.067 | 66 | 161 | 6 |

TABLE 5-continued

Result from tensile testing on samples taken from the middle of the strip before and after braze simulation

| | Delivery condition | | | | After braze simulation | | | |
|---|---|---|---|---|---|---|---|---|
| Sample | Gauge (mm) | $R_{p0.2}$ (MPa) | $R_m$ (MPa) | $A_{50\,mm}$ (%) | Gauge (mm) | $R_{p0.2}$ (MPa) | $R_m$ (MPa) | $A_{50\,mm}$ (%) |
| 70MSi | 0.069 | 162 | 183 | 7 | 0.066 | 73 | 175 | 5 |
| 70HSi | 0.069 | 180 | 192 | 1.3 | 0.067 | 54 | 155 | 9 |

The invention claimed is:

1. A sagging resistant strip produced by
   a) casting a melt comprising:
      <0.30 wt % Si,
      ≤0.5 wt % Fe,
      ≤0.3 wt % Cu
      1.0-2.0 wt % Mn,
      ≤0.5 wt % Mg,
      ≤4.0 wt % Zn,
      ≤0.5 wt % Ni,
      ≤0.3 wt % each of dispersoid forming elements from group IVb, Vb, or VIb, and
      unavoidable impurity elements, each at most 0.05 wt %, in a total amount of at most 0.15 wt %,
      the rest aluminium,
   so as to obtain a core ingot,
   b) preheating the core ingot at a temperature of less than 550° C. to form dispersoid particles, and wherein a braze alloy is provided on the core ingot either before or after said preheating,
   c) hot rolling the core ingot with the braze alloy to obtain a clad strip,
   d) cold rolling the strip obtained in step c) with a total reduction of >95% of the core, without intermediate annealing giving recrystallisation of the material, resulting in a strip having a first proof stress value, and
   e) followed by a heat treatment to the delivery temper with the purpose to soften the material by a tempering without any recrystallisation of the strip alloy,
   wherein the strip has a second proof stress value which is 10-50% lower than the first proof stress value obtained directly after cold rolling in step d) and a 0.2% proof stress range of 100-200 MPa.

2. A sagging resistant strip according to claim 1, produced by a cold rolling reduction of at least 97.5% of the core without intermediate annealing giving recrystallisation of the material.

3. A sagging resistant strip according to claim 1, wherein said melt comprises:
   0.02 to <0.3 wt % Si,
   ≤0.3 wt % Fe,
   ≤0.1 wt % Cu,
   1.3-1.8 wt % Mn,
   ≤0.1 wt % Mg,
   ≤4.0 wt % Zn,
   ≤0.5 wt % Ni,
   0.05-0.2 wt % Zr,
   and unavoidable impurity elements, each at most 0.05 wt %, in a total amount of at most 0.15 wt %,
   the rest aluminium.

4. A sagging resistant strip according to claim 3, wherein said melt comprises between 0.5 and 2.8 wt % Zn.

5. A sagging resistant strip according to claim 3, wherein said melt comprises <0.009 wt % Zn.

6. A sagging resistant strip according to claim 3, where the ingot or finstock material is clad with at least one additional layer.

7. A sagging resistant strip according to claim 3, having in the delivery temper a dispersoid particle density in the range $1\times10^6$ and $20\times10^6$ particles/mm$^2$ of particles having a diameter in the range of 50-400 nm.

8. A sagging resistant strip according to claim 3, having a final thickness of the strip less than 0.15 mm.

9. A sagging resistant strip according to claim 3, having a 0.2% proof stress value after brazing of at least 60 MPa.

10. A sagging resistant strip according to claim 3, having a sagging resistance of ≤25 mm when measured on a 0.10 mm thick strip.

11. A sagging resistant strip according to claim 3, wherein said melt comprises 0.05 to 0.25 wt % Si.

12. A sagging resistant strip according to claim 1, wherein said melt comprises <0.25 wt % Si.

13. A sagging resistant strip produced by
   a) casting a melt containing:
      <0.3 wt % Si,
      ≤0.5 wt % Fe,
      ≤0.3 wt % Cu,
      1.0-2.0 wt % Mn,
      ≤0.5 wt % Mg,
      ≤4.0 wt % Zn,
      ≤0.5 wt % Ni,
      ≤0.3 wt % each of dispersoid forming elements from group IVb, Vb, or VIb, and
      unavoidable impurity elements, each at most 0.05 wt %, in a total amount of at most 0.15 wt %,
      the rest aluminium,
   so as to obtain an core ingot,
   b) preheating the resulting core ingot at a temperature of less than 550° C. to form dispersoid particles,
   c) hot rolling the core ingot to obtain a core strip, and providing a strip of a braze alloy,
   d) cold rolling the core strip obtained in step c) with the strip of a braze alloy to obtain a clad strip and wherein cold rolling is continued to a total reduction of >95% of the core, without intermediate annealing giving recrystallisation of the material resulting in a strip having a first proof stress value, and
   e) followed by a heat treatment to the delivery temper with the purpose to soften the material by a tempering without any recrystallisation of the strip alloy,
   wherein the strip has a second proof stress value which is 10-50% lower than the first proof stress value obtained directly after cold rolling in step d) and an absolute proof stress range of 100-200 MPa.

14. A sagging resistant strip according to claim 13, wherein said melt comprises <0.25 wt % Si.

15. A sagging resistant strip according to claim 13, produced by a cold rolling reduction of at least 97.5% of the core without intermediate annealing giving recrystallisation of the material.

16. A sagging resistant strip produced by
a) twin-roll strip casting a melt comprising:
   <0.3 wt % Si,
   ≤0.5 wt % Fe,
   ≤0.3 wt % Cu
   1.0-2.0 wt % Mn,
   ≤0.5 wt % Mg,
   ≤4.0 wt % Zn,
   ≤0.5 wt % Ni,
   ≤0.3 wt % each of dispersoid forming elements from group IVb, Vb, or VIb, and
   unavoidable impurity elements, each at most 0.05 wt %, in a total amount of at most 0.15 wt %,
   the rest aluminium,
so as to obtain a core strip,
b) cold rolling the core strip to an intermediate gauge material,
c) annealing the intermediate gauge material to form dispersoid particles,
d) cold rolling the intermediate gauge material to a finstock material of final gauge with a rolling reduction of at least 60% of the core without intermediate annealing giving recrystallisation of the material, resulting in a finstock material having a first proof stress value, and
e) heat treating the finstock material to delivery temper with the purpose to soften the material by a tempering without any recrystallisation of the strip alloy,
wherein the strip has a second proof stress value which is 10-50% lower than the first proof stress value obtained directly after cold rolling in step d) and a 0.2% proof stress range of 100-200 MPa, and
wherein a braze alloy is provided on the core strip either prior to or after said cold rolling to intermediate gauge.

17. A sagging resistant strip according to claim 16, wherein said melt comprises <0.25 wt % Si.

18. A method of producing a sagging resistant strip, comprising:
a) casting a melt containing:
   <0.3 wt % Si,
   ≤0.5 wt % Fe,
   ≤0.3 wt % Cu,
   1.0-2.0 wt % Mn,
   ≤0.5 wt % Mg,
   ≤4.0 wt % Zn,
   ≤0.5 wt % Ni,
   ≤0.3 wt % each of dispersoid forming elements from group IVb, Vb, or VIb, and
   unavoidable impurity elements, each at most 0.05 wt %, in a total amount of at most 0.15 wt %,
   the rest aluminium,
so as to obtain an core ingot,
b) preheating the resulting core ingot at a temperature of less than 550° C. to form dispersoid particles, and wherein a braze alloy is provided on the core ingot either before or after said preheating,
c) hot rolling the core ingot with the braze alloy to obtain a clad strip,
d) cold rolling the strip obtained in step c) with a total reduction of >95% of the core, without intermediate annealing giving recrystallisation of the material resulting in a strip having a first proof stress value, and
e) followed by a heat treatment to the delivery temper with the purpose to soften the material by a tempering without any recrystallisation of the strip alloy, to obtain a strip having a second proof stress value which is 10-50% lower than the first proof stress value obtained directly after cold rolling in step d) and lying in the absolute proof stress range of 100-200 MPa.

19. A method according to claim 18, comprising cold rolling to a reduction of at least 97.5% of the core without intermediate annealing giving recrystallisation of the material.

20. A method according to claim 18, wherein said melt comprises:
   0.02-<0.3 wt % Si,
   ≤0.3 wt % Fe,
   ≤0.1 wt % Cu,
   1.3-1.8 wt % Mn,
   ≤0.1 wt % Mg,
   ≤4.0 wt % Zn,
   ≤0.5 wt % Ni,
   0.05-0.2 wt % Zr, and
   unavoidable impurity elements, each at most 0.05 wt %, in a total amount of at most 0.15 wt %,
   the rest aluminium.

21. A method according to claim 20, wherein said melt comprises between 0.5 and 2.8 wt % Zn.

22. A method according to claim 20, wherein said melt comprises <0.009 wt % Sn.

23. A method according to claim 20, comprising controlling the preheating step so that a strip is produced having in the delivery temper a dispersoid particle density in the range between $1 \times 10^6$ and $20 \times 10^6$ particles/mm$^2$ of particles of particles having a diameter in the range of 50-400 nm.

24. A method according to claim 20, having a final thickness of the strip less than 0.2 mm.

25. A method according to claim 20, comprising before step b) cladding the ingot or finstock material with at least one additional layer.

26. A method according to claim 20, comprising controlling the process parameters so that a strip is produced having after brazing a 0.2% proof stress value of at least 60 MPa.

27. A method according to claim 20, having a sagging resistance of ≤25 mm when measured on a 0.10 mm thick strip.

28. A method according to claim 20, wherein said melt comprises 0.05 to 0.25 wt % Si.

29. A method according to claim 18, wherein said melt comprises <0.25 wt % Si.

30. A method of producing a sagging resistant strip, comprising:
a) casting a melt containing:
   <0.3 wt % Si,
   ≤0.5 wt % Fe,
   ≤0.3 wt % Cu,
   1.0-2.0 wt % Mn,
   ≤0.5 wt % Mg,
   ≤4.0 wt % Zn,
   ≤0.5 wt % Ni,
   ≤0.3 wt % each of dispersoid forming elements from group IVb, Vb, or VIb, and
   unavoidable impurity elements, each at most 0.05 wt %, in a total amount of at most 0.15 wt %,
   the rest aluminium,
so as to obtain an core ingot,
b) preheating the resulting core ingot at a temperature of less than 550° C. to form dispersoid particles,
c) hot rolling the core ingot to obtain a core strip, and providing a strip of a braze alloy
d) cold rolling the core strip obtained in step c) with the strip of a braze alloy to obtain a clad strip and wherein cold rolling is continued to a total reduction of >95% of the core, without intermediate annealing giving recrystallisation of the material resulting in a strip having a first proof stress value, and e) followed by a heat treatment to the delivery temper with the purpose to soften the material by a tempering without any recrystallisation of the strip alloy, to obtain a strip having a second proof stress value which is 10-50% lower than the first proof stress value obtained directly after cold rolling in step d) and lying in the absolute proof stress range of 100-200 MPa.

31. A method according to claim 30, wherein said melt comprises <0.25 wt % Si.

32. A method according to claim 30, comprising cold rolling to a reduction of at least 97.5% of the core without intermediate annealing giving recrystallisation of the material.

33. A method of producing a sagging resistant strip, comprising:

a) twin-roll strip casting a melt comprising:
   <0.3 wt % Si,
   ≤0.5 wt % Fe,
   ≤0.3 wt % Cu
   1.0-2.0 wt % Mn,
   ≤0.5 wt % Mg,
   ≤4.0 wt % Zn,
   ≤0.5 wt % Ni,
   ≤0.3 wt % each of dispersoid forming elements from group IVb, Vb, or VIb and
   unavoidable impurity elements, each at most 0.05 wt %, in a total amount of at most 0.15 wt %,
   the rest aluminium,
so as to obtain a core strip, b) cold rolling the core strip to form an intermediate gauge material, c) annealing the intermediate gauge sheet material so as to form dispersoid particles, d) cold rolling the intermediate gauge article to a finstock material of final gauge with a rolling reduction of at least 60% of the core without intermediate annealing giving recrystallisation of the material, resulting in a finstock material having a first proof stress value, and e) heat treating the finstock material to the delivery temper with the purpose to soften the material by a tempering without any recrystallisation of the strip alloy, to obtain a strip having a second proof stress value which is 10-50% lower than that obtained directly after cold rolling in step d) and lying in the proof stress range of 100-200 MPa, and wherein the method further comprises providing a braze alloy on the as cast core strip either prior to or after said cold rolling to intermediate gauge.

34. A method according to claim 33, wherein said melt comprises <0.25 wt % Si.

35. A heat exchanger comprising fins made from the sagging resistant strip of claim 1.

36. Method of producing fins of a heat exchanger comprising producing a sagging resistant strip according to the method of claim 18 and forming fins from said sagging resistant strip.

* * * * *